United States Patent [19]

Snider

[11] Patent Number: 4,981,879

[45] Date of Patent: Jan. 1, 1991

[54] RIGID FOAM WITH IMPROVED "K" FACTOR FROM PERFLUORINATED HYDROCARBONS

[75] Inventor: Scott C. Snider, Seminole, Fla.

[73] Assignee: Jim Walter Research Corp., St. Petersburg, Fla.

[21] Appl. No.: 399,101

[22] Filed: Aug. 28, 1989

[51] Int. Cl.$^5$ .............................................. C08G 18/14
[52] U.S. Cl. .................................. 521/131; 428/308.4; 428/423.1
[58] Field of Search ...................... 521/131; 428/308.4, 428/423.1

[56] References Cited

U.S. PATENT DOCUMENTS

| | | | |
|---|---|---|---|
| 4,237,238 | 12/1980 | DeGuiseppi et al. | 521/131 |
| 4,417,001 | 11/1983 | Svoboda et al. | 521/114 |
| 4,595,711 | 6/1986 | Wood | 521/158 |
| 4,711,912 | 12/1987 | Snider et al. | 521/125 |
| 4,791,148 | 12/1988 | Riley et al. | 521/159 |

FOREIGN PATENT DOCUMENTS

| | | | |
|---|---|---|---|
| 738034 | 7/1966 | Canada | 400/90 |
| 53-037279 | 10/1978 | Japan . | |

*Primary Examiner*—Maurice J. Welsh
*Attorney, Agent, or Firm*—Charles W. Vanecek

[57] ABSTRACT

This invention relates to a process for preparing cellular polymers having urethane groups, isocyanurate groups, or both. The cellular polymers are prepared by reacting an organic polyisocyanate with a polyol in the presence of a blowing agent, a catalyst, and a perfluorinated hydrocarbon or a mixture of perfluorinated hydrocarbons. The use of the perfluorinated additives enhances the thermal insulating properties of the forms.

20 Claims, No Drawings

RIGID FOAM WITH IMPROVED "K" FACTOR FROM PERFLUORINATED HYDROCARBONS

BACKGROUND OF THE INVENTION

1. Field of the Invention

This invention relates to the preparation of rigid cellular polymer materials, particularly polyisocyanurate and polyurethane foams, characterized by improved insulating properties. More particularly, the invention relates to an improvement in the foam's insulating capacity by adding a perfluorinated hydrocarbon to the foam-forming composition.

2. Description of the Prior Art

The preparation of rigid foams characterized by isocyanurate and urethane linkages is well known in the art. Generally, these foams are prepared by reacting an organic polyisocyanate with a polyol in the presence of a blowing agent and a catalyst(s).

These rigid foams generally have good insulative properties and are thus desirable for use as insulating materials for the construction industry, refrigeration industry, and others. In order to improve insulating properties, a variety of techniques have been proposed, such as the addition of certain reactants, as in U.S. Pat. No. 4,165,414, or other additives, as in U.S. Pat. No. 4,795,763. Any such improvement in insulation value must be accompanied by the maintenance of other important foam properties, such as dimensional stability, thermal resistance and compressive strength to yield a viable candidate for commercial utilization.

OBJECTS OF THE INVENTION

It is accordingly an object of the present invention to provide improved rigid plastic foams, especially polyisocyanurate and polyurethane foams, having a combination of advantageous properties, including excellent thermal insulative properties, good dimensional stability, thermal resistance, and compressive strength and reduced friability, and an improved method of producing the foams.

It is another object of the present invention to provide closed cell foam materials which can be used in various types of thermal insulating applications, such as refrigeration insulation, pipe and tank insulation, structural uses, etc., as formed structures which are highly insulating, thermally resistant, low in friability, and soundproof.

It is a further object of the present invention to provide a fluorinated compound for use as an additive in the preparation of rigid plastic foams having a combination of advantageous properties, especially an improved insulating efficiency and/or cell structure.

These and other objects and advantages of the present invention will become apparent by reference to the following specification and appended claims.

DESCRIPTION OF THE INVENTION

The above objects have been achieved by the incorporation of certain fluorinated compounds into rigid polyisocyanurate and polyurethane foams. The improved foams of the invention may be prepared by reacting together a polyisocyanate and polyol in the presence of the fluorinated compound and a blowing agent(s). The reaction may be carried out in the presence of catalysts, auxiliaries and additives as required (e.g., a surfactant).

The fluorinated compounds which may be employed in the invention are substantially fluorinated or perfluorinated materials. Perfluorinated means that substantially all of the corresponding hydrogen atoms of the organic compounds have been replaced by fluorine atoms. It is preferred that at least 95% of the hydrogen atoms have been replaced, more preferably at least 98%, and even more preferably essentially 100%. Perfluorinated liquids are a preferred additive of the invention.

Fluorinated materials suitable for use with this invention comprise those which are broadly described as substantially fluorinated or perfluorohydrocarbons. Mixtures of various different perfluorinated materials can also be used. Accordingly, while some of the fluorinated compounds are solid at ambient temperature, they are soluble in ones which are liquid at ambient temperature and such a mixture could be used. The specific precursors of the foregoing perfluorocarbons are typically the corresponding hydrocarbons in which most of the hydrogen atoms have been replaced with fluorine. A preferred family of compounds are completely fluorinated, liquid hydrocarbons, such as the Fluorinert® Liquids available from the 3M Company, and the Multifluor Inert Liquids available from Air Products and Chemicals, Inc.

Use of the fluorinated compounds as liquid fillers in the rigid foams brings about a significant improvement in insulation value and the formation of a smaller cell structure. Foams with improved initial k-factor result from the addition of minor amounts of the low boiling perfluorinated hydrocarbons. The amount of fluorinated material in the foam is chosen to obtain the desired level of improved insulation properties, typically a k-factor reduction of about 3 to 10%. Typically, the amount ranges from about 0.2% to 15% by weight of the reactive components (e.g., isocyanate and polyol) in the foam forming mixture. For example, this amount can be from about 0.6% to 10%, particularly 0.6% to 5%, of the reactive components. More additive may be required in some foam systems than others, but the amount for any particular system can easily be determined.

Addition of the liquid perfluorinated hydrocarbon(s) to the foam forming mixture reduces the foam characteristics of cell size and initial k-factor of the resultant foam from those of the corresponding foam having the same index and prepared from the same foam-forming composition except that the perfluorinated hydrocarbon(s) is omitted. The perfluorinated hydrocarbons are advantageously low boiling liquids whose air solubilizing capability is believed to contribute to the improved foam properties. The boiling point of the perfluorinated hydrocarbon(s) is suitably less than about 215° C. and preferably less than 105° C. The appropriate boiling point and content of the perfluorinated additive for cell size reduction and lowered initial k-factor can readily be determined through routine experimentation.

The lower boiling perfluorinated hydrocarbons can obviously function as sole or co-blowing agents for the foam forming composition, thus serving a dual function as blowing agent and cell size regulator. However, due to various factors, including their expense and poorer solubility in the components of the composition, the perfluorinated hydrocarbons are not ordinarily used as blowing agents in polyurethane or polyisocyanurate foam formation. In accordance with the present invention, the perfluorinated hydrocarbons are customarily used in conjunction with the conventional blowing agents, such as the chlorine-and/or bromine-containing hydrocarbons, especially the chlorofluorocarbons.

In the broadest aspects of the present invention, any organic polyisocyanate can be employed in the preparation of the foams of the present invention. The organic polyisocyanates which can be used include aromatic, aliphatic and cycloaliphatic polyisocyanates and combinations thereof. Representative of these types are the diisocyanates such as m-phenylene diisocyanate, toluene-2,4-diisocyanate, toluene-2,6-diisocyanate, mixtures of 2,4- and 2,6-toluene diisocyanate, hexamethylene-1,6-diisocyanate, tetramethylene-1,4-diisocyanate, cyclohexane-1,4-diisocyanate, hexahydrotoluene 2,4- and 2,6-diisocyanate, naphthalene-1,5-diisocyanate, diphenylmethane-4,4'-diisocyanate, 4,4'-diphenylenediisocyanate, 3,3'-dimethoxy-4,4'-biphenyldiisocyanate, 3,3'-dimethyl-4,4'-biphenyldiisocyanate, and 3,3'-dimethyldiphenylmethane-4,4'-diisocyanate; the triisocyanates such as 4,4', 4"-triphenylmethane-triisocyanate, polymethylenepolyphenyl isocyanate, toluene-2,4,6-triisocyanate; and the tetraisocyanates such as 4,4'-dimethyldi-phenyl-methane-2,2', 5,5'-tetraisocyanate. Especially useful are polymethylenepolyphenyl isocyanates. These isocyanates are prepared by conventional methods known in the art such as the phosgenation of the corresponding organic amine.

Prepolymers may also be employed in the preparation of the foams of the present invention. These prepolymers are prepared by reacting an excess of organic polyisocyanate or mixtures thereof with a minor amount of an active hydrogen-containing compound as determined by the well-known Zerewitinoff test, as described by Kohler in "Journal of the American Chemical Society," 49,3181 (1927). These isocyanate group-terminated quasi-prepolymers and their methods of preparation are well known in the art. The use of any one specific active hydrogen compound is not critical hereto, rather any such compound can be employed herein.

The preferred polymethylene polyphenylisocyanates desirably have a functionality of at least 2.1 and preferably 2.5 to 3.2. These preferred polymethylene polyphenylisocyanates generally have an equivalent weight between 120 and 180 and preferably have an equivalent weight between 130 and 145.

A preferred subclass of polymethylene polyphenylisocyanates especially useful in the present invention is a mixture of those of the following formula:

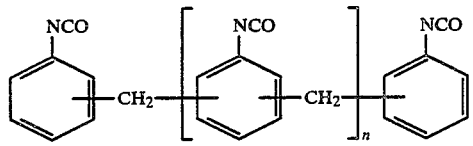

wherein n is an integer from 0 to 8 and wherein the mixture has the above-described functionality and equivalent weight. This mixture should have a viscosity between 100 and 4,000 and preferably 250 to 2500 centipoises measured at 25° C. in order to be practical for use in the present invention.

Examples of suitable polymethylene polyphenylisocyanates useful in the present invention include those of the above formula, wherein n is 1 as well as mixtures wherein n can have any value from 0 to 8 as long as the mixture has the specified equivalent weight. One such mixture has 40 weight percent of n=0, 22 weight percent of n=1, 12 weight percent of n=2, and 26 weight percent of n=3 to about 8. The preferred polymethylene polyphenyl isocyanates are described in U.S. application Ser. No. 322,843, filed Jan. 11, 1973, now abandoned. The synthesis of polymethylene polyphenylisocyanates is described in Seeger et al., U.S. Pat. No. 2,683,730 and in Powers U.S. Pat. No. 3,526,652 at column 3, lines 6–21. It should, therefore, be understood that the polymethylene polyphenylisocyanates available on the market under the trade names of CODE 047 or PAPI-20 (Dow) and MR 200 (Mobay/Bayer) can successfully be employed within the spirit and scope of the present situation.

In addition to the polyisocyanate, the foam-forming formulation also contains an organic compound containing at least 1.8 or more isocyanate-reactive groups per molecule (hereinafter called "isocyanate-reactive compounds"). Suitable such compounds include polyols, polyamines, polyacids, polymercaptans and like compounds. Preferred isocyanate-reactive compounds are the polyester and polyether polyols. Particularly preferred are polyester polyols or mixtures of polyester and polyether polyols.

The polyester polyols useful in the invention can be prepared by known procedures from a polycarboxylic acid or acid derivative, such as an anhydride or ester of the polycarboxylic acid, and a polyhydric alcohol. The acids and/or the alcohols may, of course, be used as mixtures of two or more compounds in the preparation of the polyester polyols. Particularly suitable polyester polyols of the invention are aromatic polyester polyols containing phthalic acid residues.

The polycarboxylic acid component, which is preferably dibasic, may be aliphatic, cycloaliphatic, aromatic and/or heterocyclic and may optionally be substituted, for example, by halogen atoms, and/or may be unsaturated. Examples of suitable carboxylic acids and derivatives thereof for the preparation of the polyester polyols include: oxalic acid; malonic acid; succinic acid; glutaric acid; adipic acid; pimelic acid; suberic acid; azelaic acid; sebacic acid; phthalic acid; isophthalic acid; trimellitic acid; terephthalic acid; phthalic acid anhydride; tetrahydrophthalic acid anhydride; pyromellitic dianhydride; hexahydrophthalic acid anhydride; tetrachlorophthalic acid anhydride; endomethylene tetrahydrophthalic acid anhydride; glutaric acid anhydride; maleic acid; maleic acid anhydride; fumaric acid; dibasic and tribasic unsaturated fatty acids optionally mixed with monobasic unsaturated fatty acids, such as oleic acid; terephthalic acid dimethyl ester and terephthalic acid-bis-glycol ester.

Any suitable polyhydric alcohol may be used in preparing the polyester polyols. The polyols can be aliphatic, cycloaliphatic, aromatic and/or heterocyclic, and are preferably selected from the group consisting of diols, triols and tetrols. Aliphatic dihydric alcohols having no more than about 20 carbon atoms are highly satisfactory. The polyols optionally may include substituents which are inert in the reaction, for example, chlorine and bromine substituents, and/or may be unsaturated. Suitable amino alcohols, such as, for example, monoethanolamine, diethanolamine, triethanolamine, or the like may also be used. Moreover, the polycarboxylic acid(s) may be condensed with a mixture of polyhydric alcohols and amino alcohols.

Examples of suitable polyhydric alcohols include: ethylene glycol; propylene glycol-(1,2) and -(1,3); butylene glycol-(1,4) and -(2,3); hexane diol-(1,6); octane diol-(1,8); neopentyl glycol; 1,4-bishydroxymethyl cyclohexane, 2-methyl-1,3-propane diol; glycerin; trimethylolproprane; trimethylolethane; hexane triol-(1,2,6); butane triol-(1,2,4); pentaerythritol; quinitol; mannitol; sorbitol; formitol; α-methyl-glucoside; diethylene glycol; triethylene glycol; tetrathylene glycol and higher polyethylene glycols; dipropylene glycol and higher polypropylene glycols a well as dibutylene glycol and higher polybutylene glycols. Especially suitable polyols are oxyalkylene glycols, such as diethylene glycol, dipropylene glycol, triethylene glycol, tripropylene glycol, tetraethylene glycol, tetrapropylene glycol, trimethylene glycol and tetramethylene glycol.

The term "polyester polyol" as used in this specification and claims includes any minor amounts of unreacted polyol remaining after the preparation of the polyester polyol and/or unesterified polyol added after the preparation.

The polyester polyols of the invention advantageously contain at least 1.8 hydroxyl groups and generally have an average equivalent weight of from about 75 to 500. Preferably, the polyesters contain from about 1.8 to 8 hydroxyl groups and have an average equivalent weight of from about 100 to 300, more preferably from about 120 to 250. Highly desirable aromatic polyester polyols of the invention have an average functionality of about 1.8 to 5, preferably about 2 to 2.5. Polyesters whose acid component advantageously comprises at least about 30% by weight of phthalic acid residues are particularly useful. By phthalic acid residue is meant the group

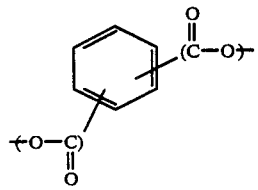

Particularly suitable compositions containing phthalic acid residues for use in the invention are (a) ester-containing by-products from the manufacture of dimethyl terephthalate, (b) scrap polyalkylene terephthalates, (c) phthalic anhydride, (d) residues from the manufacture of phthalic anhydride, (e) terephthalic acid, (f) residues from the manufacture of terephthalic acid, (g) isophthalic acid and (h) trimellitic anhydride. These compositions may be converted to polyester polyols through conventional transesterification or esterification procedures.

While the polyester polyols can be prepared from substantially pure reactant materials, more complex ingredients are advantageously used, such as sidestream, waste or scrap residues from the manufacture of phthalic acid, terephthalic acid, dimethyl terephthalate, polyethylene terephthalate, adipic acid and the like. Suitable polyol side-stream sources include ethylene glycol, diethylene glycol, triethylene glycol and higher homologs or mixtures thereof. The similar homologous series of propylene glycols can also be used. Glycols can also be generated in situ during preparation of the polyester polyols of the invention by depolymerization of polyalkylene terephthalates. For example, polyethylene terephthalate yields ethylene glycol. Polyester polyols derived from raw materials containing compounds having the above defined phthalic acid residues constitute a preferred embodiment of the invention.

A preferred polycarboxylic acid component for use in the preparation of the aromatic polyester polyols is phthalic anhydride. This component can be replaced by phthalic acid or a phthalic anhydride bottoms composition, a phthalic anhydride crude composition, or a phthalic anhydride light ends composition, as such compositions are defined in U.S. Pat. No. 4,529,744.

Other preferred materials containing phthalic acid residues are polyalkylene terephthalates, especially polyethylene terephthalate (PET), residues or scraps.

Still other preferred residues are DMT process residues, which are waste or scrap residues from the manufacture of dimethyl terephthalate (DMT). The term "DMT process residue" refers to the purged residue which is obtained during the manufacture of DMT in which p-xylene is converted through oxidation and esterification with methanol to the desired product in a reaction mixture along with a complex mixture of by-products. The desired DMT and the volatile methyl p-toluate by-product are removed from the reaction mixture by distillation leaving a residue. The DMT and methyl p-toluate are separated, the DMT is recovered and methyl p-toluate is recycled for oxidation. The residue which remains can be directly purged from the process or a portion of the residue can be recycled for oxidation and the remainder diverted from the process, or, if desired, the residue can be processed further, as, for example, by distillation, heat treatment and/or methanolysis to recover useful constituents which might otherwise be lost, prior to purging the residue from the system. The residue which is finally purged from the process, either with or without additional processing, is herein called DMT process residue.

These DMT process residues may contain DMT, substituted benzenes, polycarbomethoxy diphenyls, benzyl esters of the toluate family, dicarbomethoxy fluorenone, carbomethoxy benzocoumarins and carbomethoxy polyphenols. Hercules, Inc., Wilmington, Del., sells DMT process residues under the trademark Terate ® 101. DMT process residues having a different composition but still containing the aromatic esters and acids are also sold by DuPont and others. The DMT process residues to be transesterified in accordance with the present invention preferably have a functionality at least slightly greater than 2.

Such suitable residues include those disclosed in U.S. Pat. Nos. 3,647,759, 4,411,949, and 4,714,717, the disclosures of which with respect to the residues are hereby incorporated by reference.

The polyols which can be employed alone or in combination with polyester polyols in the preparation of the fluorinated compound-containing polyurethane and polyisocyanurate foam compositions of the invention include monomeric polyols and polyether polyols. The polyether polyols are found particularly useful in preparing rigid polyurethane foams. Polyether polyols of this type are the reaction products of a polyfunctional active hydrogen initiator and a monomeric unit such as ethylene oxide, propylene oxide, butylene oxide and mixtures thereof, preferably propylene oxide, ethylene oxide or mixed propylene oxide and ethylene oxide. The polyfunctional active hydrogen initiator preferably has a functionality of 2–8, and more preferably has a functionality of 3 or greater (e.g., 4–8).

A wide variety of initiators may be alkoxylated to form useful polyether polyols. Thus, for example, polyfunctional amines and alcohols of the following type may be alkoxylated: monoethanolamine, diethanolamine, triethanolamine, ethylene glycol, polyethylene glycol, propylene glycol, hexanetriol, polypropylene glycol, glycerine, sorbitol, trimethylolpropane, pentaerythritol, sucrose and other carbohydrates. Such amines or alcohols may be reacted with the alkylene oxide(s) using techniques known to those skilled in the art. The hydroxyl number which is desired for the finished polyol would determine the amount of alkylene oxide used to react with the initiator. The polyether polyol may be prepared by reacting the initiator with a single alkylene oxide, or with two or more alkylene oxides added sequentially to give a block polymer chain or at once to achieve a random distribution of such alkylene oxides. Polyol blends such as a mixture of high molecular weight polyether polyols with lower molecular weight polyether polyols can also be employed.

The polyurethane foams can be prepared by reacting the polyol and polyisocyanate on a 0.7:1 to 1.1:1 equivalent basis. In an advantageous embodiment of the invention wherein the polyester polyols are combined with another polyol(s) to produce polyurethane foams, the polyester polyols can comprise about 5 to 100, preferably about 5 to 75, and more preferably about 20 to 50, weight percent of the total polyol content in the foam preparations. The polyisocyanurate foams of the invention are advantageously prepared by reacting the polyisocyanate with a minor amount of polyol, such as sufficient polyol to provide about 0.10 to 0.70 hydorxyl equivalents of polyol per equivalent of said polyisocyanate, wherein the polyester polyol comprises about 5 to 100, and preferably about 50 to 100, weight percent of the total polyol content in the foam preparation.

Any suitable blowing agent can be employed in the foam compositions of the present invention. Water, air, nitrogen, carbon dioxide, readily volatile organic substances and/or compounds which decompose to liberate gases (e.g., azo compounds) may be used. Typically, these blowing agents are liquids having a boiling point between minus 50° C. and plus 100° C. and preferably between 0° C and 50° C. The preferred liquids are hydrocarbons or halohydrocarbons. Examples of suitable blowing agents include, among others, chlorinated and fluorinated hydrocarbons such as trichlorofluoromethane, $CCl_2FCClF_2$, $CCl_2FCF_2$, $CClFCClF_2$, trifluorochloropropane, difluorodichloromethane, 1-fluoro -1,1-dichloroethane, 1,1-trifluoro-2,2-dichloroethane, 1,1-difluoro-1-chloroethane, methylene chloride, diethylether, isopropyl ether, n-pentane, cyclopentane, 2-methylbutane, methyl formate, carbon dioxide and mixtures thereof. Trichlorofluoromethane is a preferred blowing agent.

The foams also can be produced using a froth-foaming method, such as the one disclosed in U.S. Pat. No. 4,572,865. In this method, the frothing agent can be any material which is inert to the reactive ingredients and easily vaporized at atmospheric pressure. The frothing agent advantageously has an atmospheric boiling point of 50° to 10° C., and includes carbon dioxide, dichlorodifluoromethane, monochlorodifluoromethane, trifluoromethane, monochlorotrifluoromethane, monochloropentafluoroethane, vinylfluoride, vinylidenefluoride, 1,1-difluoroethane, 1,1,1-trichlorodifluoroethane, and the like. Particularly preferred is dichlorodifluoromethane. A higher boiling blowing agent is desirably used in conjunction with the frothing agent. The blowing agent is a gaseous material at the reaction temperature and advantageously has an atmospheric boiling point ranging from about 10° to 80° C. Suitable blowing agents include trichloromonofluoromethane, 1,1,2-trichloro-1 ,2,2-trifluoroethane, acetone, pentane, and the like, preferably trichloromonofluoromethane.

The foaming agents, e.g., trichlorofluoromethane blowing agent or combined trichlorofluoromethane blowing agent and dichlorodifluoromethane frothing agent, are employed in an amount sufficient to give the resultant foam the desired bulk density which is generally between 0.5 and 10, preferably between 1 and 5, and most preferably between 1.5 and 2.5, pounds per cubic foot. The foaming agents generally comprise from 1 to 30, and preferably comprise from 5 to 20 weight percent of the composition. When a foaming agent has a boiling point at or below ambient, it is maintained under pressure until mixed with the other components. Alternatively, it can be maintained at subambient temperatures until mixed with the other components. Mixtures of foaming agents can be employed.

Any suitable surfactant can be employed in the foams of this invention. Successful results have been obtained with silicone/ethylene oxide/propylene oxide copolymers as surfactants. Examples of surfactants useful in the present invention include, among others, polydimethylsiloxane-polyoxyalkylene block copolymers available from the Union Carbide Corporation under the trade names "L-5420" and "L-5340" and from the Dow Corning Corporation under the trade name "DC-193". Other suitable surfactants are those described in U.S. Pat. Nos. 4,365,024 and 4,529,745 and supplied by Sloss Industries Corporation under the trademarks Foamstab 100 and 200. Generally, the surfactant comprises from about 0.05 to 10, and preferably from 0.1 to 6, weight percent of the foam-forming composition.

Any of the catalysts conventionally employed in the art to catalyze the reaction of an isocyanate with an isocyanate-reactive compound can be employed in the foam preparations of the invention. Such catalysts include organic and inorganic acid salts of, and organometallic derivatives of, bismuth, lead, tin, iron, antimony, uranium, cadmium, cobalt, thorium, aluminum, mercury, zinc, nickel, cerium, molybdenum, vanadium, copper, manganese, and zirconium, as well as phosphines and tertiary organic amines. Examples of such catalysts are dibutyltin dilaurate, dibutyltin diacetate, stannous octoate, lead octoate, cobalt naphthenate, triethylamine, triethylenediamine, N,N,N',N'-tetramethylethylenediamine, 1,1,3,3-tetramethylguanidine, N,N, N'N'-tetramethyl-1,3-butanediamine, N,N-dimethylethanolamine, N, N-diethylethanolamine, and the like. The catalysts generally comprise from about 0.1 to 20, and preferably from 0.3 to 10, weight percent of the total foam-forming composition.

In the preparation of the polyisocyanurate rigid foams, any catalysts known to catalyze the trimerization of isocyanates to form isocyanurates, and to catalyze the reaction of isocyanate groups with hydroxyl groups to form polyurethanes, can be employed. One preferred type of catalyst is a mixture of a tertiary amino phenol, such as 2,4,6-tris( dimethylaminomethyl)phenol (sold by Rohm and Haas Co. under the designation "DMP-30"), and an alkali metal carboxylate, such as potassium-2-ethyl hexoate, the synthesis and use of which are described in U.S. Pat. No. 4,169,921. The disclosure of this patent is hereby incorporated by reference. The equivalent ratio of tertiary amino phenol to alkali metal carboxylate in the cocatalyst composition is desirably about 0.4:1 to 2.5:1. Another preferred catalyst system is a mixture comprising (i) a salt of a low molecular weight carboxylic acid selected from the group consisting of an alkali metal salt and an alkaline earth metal salt and mixtures thereof (e.g., potassium acetate), (ii) a salt of a higher molecular weight carboxylic acid selected from the group consisting of an alkali metal salt and an alkaline earth metal salt and mixtures thereof, the higher molecular weight carboxylic acid having from about 5 to 30 carbon atoms (e.g. potassium octoate), and (iii) a tertiary amine (e.g., 2,4,6-tris [dimethylaminomethyl] phenol). This mixture is described in U.S. Pat. No. 4,710,521, whose disclosure is hereby incorporated by reference.

Other additives may also be included in the foam formulations. Included are processing aids, viscosity reducers, such as 1-methyl-2-pyrrolidinone and propylene carbonate, nonreactive and reactive flame retardants, such as tris(2-chloroethyl)-phosphate, dispersing agents, plasticizers, mold release agents, antioxidants, compatibility agents and fillers and pigments. The use of such additives is well known to those skilled in the art.

The polyisocyanurate and polyurethane foams can be prepared by mixing together the foam-forming ingredients, including the perfluorinated additive, at temperatures ranging from about 0° C. to 150° C. Any order of mixing is acceptable provided that the perfluorinated material is homogenously blended into the foam-forming formulation and the reaction of the polyisocyanate and isocyanate-reactive compound does not begin until all components are mixed. Preferably, a mixture comprising the polyisocyanate, blowing or foaming agent, surfactant, and perfluorinated additive is formed, and then this mixture is combined with the remaining components, whereupon the total mixture is foamed.

In one embodiment of the invention, the ingredients of the foam-forming formulation can be mixed in any suitable manner, such as by mixing at ambient temperature with a high speed machine, and then the foaming reaction mixture is poured into a suitable mold and allowed to cure. Curing is generally carried out at ambient or, if desired to accelerate the cure, at elevated temperatures, the permissible range being desirably about 20° C. to 90° C. for periods of time which will vary inversely with the curing temperature employed and can be from about 1 to 48 hours. The overall reaction usually is accelerated by preheating the mold at temperatures from about 100° to 130° F. and/or employing conventional high temperature post curing procedures.

The mold will advantageously have surfacing material, such as of steel, aluminum, plastic, asbestos, felt, etc., at its inner surface. When the reaction mixture foams in the space defined by the mold, it forms an insulating panel or laminate with the facing material bonded to the resulting foam. An adhesive may be used to enhance bonding of the foam to the surface material or facer. The adhesive must be carefully selected to provide required fireproofing characteristics.

The invention also includes a process for producing a laminate in a continuous manner by depositing the foam-forming mixture on a facing sheet being conveyed along a production line, and preferably placing another facing sheet on the deposited mixture. The foam-forming mixture is conveniently thermally cured at a temperature from about 20° C. to 150° C. in a suitable apparatus, such as an oven or heated mold. The facing sheets of the continuously manufactured laminates can be any of those previously employed to produce building panels. Examples of suitable facing sheets include, among others, those of kraft paper, aluminum, and asphalt impregnated felts, as well as laminates of two or more of the above.

The foam materials of the invention can also be used, with or without a facer(s), for pipe insulation.

The foam materials of the invention can contain various reinforcement materials, such as a quantity of glass fibers, as described in U.S. Pat. Nos. 4,118,533 and 4,284,683, the disclosures of which are hereby incorporated by reference.

The invention is further illustrated by the following examples in which all parts and percentages are by weight unless otherwise indicated.

EXAMPLE 1

This example illustrates the preparation of polyisocyanurate foams utilizing perfluorinated hydrocarbon additives.

In each foam preparation, the quantities of ingredients listed below in Table I were added to a vessel. First, a mixture of the isocyanate, blowing agent and surfactant was formed and cooled to 15.6° C. This mixture, and the polyol and perfluorocarbon were added to a vessel and mixed at 3600 rpm for 10 seconds. The catalyst was next added by syringe to the contents of the vessel. All ingredients were thereafter mixed at 3600 rpm for an additional 10 seconds and then poured into a box, yielding a rigid polyisocyanurate foam.

Characteristics of the foams produced (Foams A-C) are shown in Table I. As can be seen from the results of this table, the beneficial reduction in k-factor brought about by use of Perfluorocarbon APF-56 was not repeated in the case of the higher boiling perfluorocarbon.

TABLE I

PREPARATION OF POLYISOCYANURATE FOAMS

| | FOAM | | |
|---|---|---|---|
| | A | B | C |
| INGREDIENTS (pts by wt) | | | |
| Isocyanate[1] | 232 | 232 | 232 |
| R-11B | 55 | 55 | 55 |
| Surfactant[2] | 2.5 | 2.5 | 2.5 |
| Polyol PS-3152C[3] | 68 | 68 | 68 |
| Perfluorocarbon APF-56[4] | 0 | 12.5 | 0 |
| Perfluorocarbon APF-215[5] | 0 | 0 | 12.5 |
| Catalyst[6] | 11.2 | 11.5 | 11.6 |
| FOAM PROPERTIES | | | |
| Reactivity (sec) | 18/29/134/37 | 15/26/32/33 | 15/25/31/25 |

TABLE I-continued
PREPARATION OF POLYISOCYANURATE FOAMS

| | FOAM | | |
|---|---|---|---|
| | A | B | C |
| (Cream/Gel/Firm/Tack-free) | | | |
| Density (lb/ft$^3$) | 1.72 | 1.69 | 1.78 |
| Initial k-factor of 1" Thick Core (Btu-in/hr-ft$^2$-°F.) | .122 | .116 | .128 |

[1] Isocyanate having an equivalent weight of 138, an acidity of 0.03% HCl, and a viscosity of 2000 cps at 25° C.
[2] Surfactant supplied by the Union Carbide Corporation under the trade name L-5340.
[3] Polyol PS-3152C = reaction product of phthalic anhydride and diethylene glycol (DEG) having a hydroxyl number of 320, a viscosity at 25° C. of 2,500 cps and 15% free DEG (Stepan Company).
[4] Perfluorocarbon APF-56 = perfluorinated hydrocarbons with a boiling point of 56° C. supplied by Air Products and Chemicals, Inc. under the trade name Multifluor APF-56.
[5] Perfluorocarbon APF-215 = perfluorinated hydrocarbons with a boiling point of 215° C. supplied by Air Products and Chemicals, Inc. under the trade name Multifluor APF-215.
[6] Catalyst = mixture employed in the form of a solution in DEG in a weight ratio of 1.18 potassium acetate: 1.62 potassium octoate: 0.69 DMP-30: 6.51 DEG.

EXAMPLE 2

This example illustrates the preparation of further polyisocyanurate foams utilizing different perfluorinated hydrocarbon additives.

The foams were prepared according to the procedure of Example 1 from the following ingredients and quantities thereof:

| INGREDIENTS | QUANTITY (parts by weight) |
|---|---|
| Isocyanate[1] | 232 |
| R-11B | 55 |
| Surfactant[2] | 2.0 |
| Polyol PS-3152C[3] | 68 |
| Perfluorocarbon | (See Table II) |
| Catalyst[4] | 11.4–11.5 |

[1] Of Example 1.
[2] Surfactant supplied by the Union Carbide Corporation under the trade name Y-10222.
[3] Of Example 1.
[4] Of Example 1.

Various characteristics of the polyisocyanurate foams produced with the perfluorocarbon additives (Foams B-D) and without the additives (Foam A) are shown in the following Table II. It is again seen that use of a perfluorocarbon with an undesirably high boiling point of 215° C. leads to an increase in k-factor over that of the control, whereas the lower boiling perfluorocarbons yield a reduced k-factor. It was also found that foam friability decreases with decreasing boiling point of the perfluorocarbon.

TABLE II
PREPARATION OF POLYISOCYANURATE FOAMS

| | PERFLUOROCARBON | | FOAM PROPERTIES | | | | |
|---|---|---|---|---|---|---|---|
| FOAM | NAME | PTS BY WT | REACTIVITY[4] (sec) | DENSITY (lb/ft$^3$) | % CLOSED CELLS | INITIAL k-FACTOR[5] | FRIABILITY (%) |
| A | — | — | 17/28/35/38 | 1.71 | 86.8 | .132 | 21.4 |
| B | FC-72[1] | 12.7 | 17/31/36/40 | 1.70 | 90.4 | .124 | 16.0 |
| C | FC-84[2] | 12.6 | 17/28/36/39 | 1.73 | 90.1 | .124 | 25.6 |
| D | FC-70[3] | 12.0 | 17/26/30/32 | 2.03 | 79.4 | .159 | 99.8 |

[1] Perfluorocarbon FC-72 = perfluorinated hydrocarbons with a boiling point of 56° C. supplied by the 3M Company.
[2] Perfluorocarbon FC-84 = perfluorinated hydrocarbons with a boiling point of 80° C. supplied by the 3M Company.
[3] Perfluorocarbon FC-70 = perfluorinated hydrocarbons with a boiling point of 215° C. supplied by the 3M Company.
[4] Cream/Gel/Firm/Tack-free.
[5] Of 1" thick core (Units = Btu-in/hr-ft$^2$-°F.).

EXAMPLE 3

This example illustrates the preparation of polyisocyanurate foams utilizing further perfluorinated hydrocarbon additives with different boiling points.

The foams were prepared according to the procedure of Example 1 from the quantities of ingredients listed below in Table III. Characteristics of the foams produced are shown in the table. The Table III results show that an improvement in insulation value is brought about through use of the perfluorocarbons. The lower boiling Perfluorocarbon FC-87 is especially beneficial because it significantly reduces foam friability.

TABLE III
PREPARATION OF POLYISOCYANURATE FOAMS

| | FOAM | | | | | | | |
|---|---|---|---|---|---|---|---|---|
| | A | B | C | D | E | F | G | H |
| INGREDIENTS (pts by weight) | | | | | | | | |
| Isocyanate[1] | 232 | 232 | 232 | 232 | 224 | 224 | 224 | 224 |
| R-11B | 55 | 55 | 55 | 55 | 55 | 55 | 55 | 55 |
| Surfactant[2] | 2 | 2 | 2 | 2 | 2 | 2 | 2 | 2 |
| Polyol PS-3152C[3] | 68 | 68 | 68 | 68 | 0 | 0 | 0 | 0 |
| Polyol PS-2502A[4] | 0 | 0 | 0 | 0 | 76 | 76 | 76 | 76 |
| Perfluorocarbon FC-75[5] | 0 | 10.0 | 0 | 0 | 0 | 10.1 | 0 | 0 |
| Perfluorocarbon FC-87[6] | 0 | 0 | 2.2 | 13.9 | 0 | 0 | 7.8 | 11.2 |

TABLE III-continued

PREPARATION OF POLYISOCYANURATE FOAMS

| FOAM | A | B | C | D | E | F | G | H |
|---|---|---|---|---|---|---|---|---|
| Catalyst[7] | 11.2 | 11.1 | 11.1 | 11.2 | 11.4 | 11.2 | 11.3 | 10.9 |
| FOAM PROPERTIES | | | | | | | | |
| Reactivity (sec) (Cream/Gel/Firm/Tack-free) | 17/27/32/35 | 18/30/34/40 | 19/29/34/37 | 17/—/34/40 | 13/23/26/30 | 13/23/25/31 | 10/—/27/32 | 10/25/27/31 |
| Density (lb/ft$^3$) | 1.70 | 1.74 | 1.66 | 1.63 | 1.63 | 1.72 | 1.58 | 1.56 |
| % Closed Cells | 89.5 | 91.8 | 89.4 | 89.8 | 90.3 | 90.9 | 91.3 | 93.0 |
| Friability (% wt loss) | 22.9 | 30.8 | 15.9 | 15.8 | 19.2 | 31.1 | 10.9 | 9.7 |
| Initial k-factor of 1″ Thick Core (Btu-in/hr-ft$^2$-°F.) | .124 | .117 | .119 | .118 | .122 | .116 | .115 | .114 |

[1] Of Example 1.
[2] Of Example 2.
[3] Of Example 1.
[4] Polyol PS-2502A = polyester polyol having a hydroxyl number of 235 and a viscosity at 25° C. of 2000-3500 cps (Stepan Company).
[5] Perfluorocarbon FC-75 = perfluorinated hydrocarbons with a boiling point of 102° C. supplied by the 3M Company.
[6] Perfluorocarbon FC-87 = perfluorinated hydrocarbons with a boiling point of 28-38° C. supplied by the 3M Company.
[7] Of Example 1.

EXAMPLE 4

This example illustrates the effect on polyisocyanurate foam properties of varying the concentration of the perfluorinated hydrocarbon additive.

The foams were prepared according to the procedure of Example 1 from the following ingredients and quantities thereof:

| INGREDIENTS | QUANTITY (parts by weight) |
|---|---|
| Isocyanate[1] | 232 |
| R-11B | 55 |
| Surfactant[2] | 2.0 |
| Polyol PS-3152C[3] | 68 |
| Perfluorocarbon APF-56[4] | (See Table IV) |
| Catalyst[5] | 11.5–11.6 |

[1] Of Example 1.
[2] Of Example 2.
[3] Of Example 1.
[4] Of Example 1.
[5] Of Example 1.

Various characteristics of the foams are shown in the following Table IV. The data show that as low a concentration as 2 parts by weight of Perfluorocarbon APF-56 is effective in this particular foam system.

The foams were prepared according to the procedure of Example 1 from the following ingredients and quantities thereof:

| INGREDIENTS | QUANTITY (pts by weight) |
|---|---|
| Isocyanate[1] | 259 |
| R-11B | 57 |
| Surfactant[2] | 2 |
| Polyol PS-3152C[3] | 41 |
| Perfluorocarbon APF-56[4] | (See Table V) |
| Catalyst[5] | 11.8–11.9 |

[1] Polyester polyol derived quasi-prepolymer having a viscosity of 13,650 cps at 25° C. and a free isocyanate content of 24.8% (BASF Corporation).
[2] Of Example 2.
[3] Of Example 1.
[4] Of Example 1.
[5] Of Example 1.

Various characteristics of the foams are shown in the following Table V. The system dependency of the perfluorocarbon additive is shown by this table where Perfluorocarbon APF-56 is seen to be ineffective at 2 pts by wt but effective at 12.5 pts by wt.

TABLE IV

PREPARATION OF POLYISOCYANURATE FOAMS

FOAM PROPERTIES

| FOAM | PERFLUOROCARBON LEVEL (pts by wt) | REACTIVITY[1] (sec) | DENSITY (lb/ft$^3$) | % CLOSED CELLS | INITIAL k-FACTOR[2] |
|---|---|---|---|---|---|
| A | 0 | 21/37 | 1.79 | 88.0 | .128 |
| B | 2 | 20/35 | 1.79 | 89.5 | .119 |
| C | 4.25 | 20/36 | 1.79 | 91.0 | .121 |
| D | 6 | 20/38 | 1.76 | 91.2 | .118 |
| E | 9 | 19/35 | 1.82 | 91.7 | .119 |
| F | 12.5 | 20/38 | 1.83 | 90.8 | .120 |
| G | 25 | 20/35 | 1.89 | 92.2 | .119 |

[1] Cream/Firm.
[2] Of 1″ thick core (Units = Btu-in/hr-ft$^2$-°F.).

EXAMPLE 5

This example illustrates the use of a perfluorinated hydrocarbon additive in the preparation of polyisocyanurate foams from an isocyanate-terminated quasi-prepolymer.

TABLE V

PREPARATION OF POLYISOCYANURATE FOAMS

| FOAM | A | B | C |
|---|---|---|---|
| Perfluorocarbon Level (pts by wt) | 0 | 2 | 12.5 |
| FOAM PROPERTIES | | | |
| Reactivity (sec) (Cream/Firm) | 17/50 | 17/50 | 16/55 |
| Density (lb/ft$^3$) | 1.80 | 1.73 | 1.82 |

TABLE V-continued

PREPARATION OF POLYISOCYANURATE FOAMS

|  | A | B | C |
|---|---|---|---|
| % Closed Cells | 89.1 | 88.5 | 90.1 |
| Initial k-factor of 1" Thick Core (Btu-in/hr-ft²-°F.) | .121 | .120 | .112 |

EXAMPLE 6

This example illustrates the use of a perfluorinated hydrocarbon additive in the preparation of polyisocyanurate foams from an isocyanate-terminated quasi-prepolymer and two different polyester polyols.

The foams were prepared according to the procedure of Example 1 from the quantities of ingredients listed below in Table VI. Characteristics of the foams produced are shown in the table. As the data indicate, the perfluorocarbon improved the insulation value and friability in both foam systems.

Footnotes: 1. Polyester polyol derived quasi-prepolymer having a viscosity of 8,050 cps at 25° C. and a free isocyanate content of 25.5% (BASF Corporation). 2. Of Example 2. 3. Of Example 1. 4. Polyol PS-2002=reaction product of phthalic anhydride and DEG having a hydroxyl number of 200, a viscosity at 25° C. of 9,120 cps and 4% free DEG (Stepan Company). 5. Of Example 2. 6. Of Example 1.

EXAMPLE 7

This example illustrates the use of two different perfluorinated hydrocarbon additives in the preparation of polyisocyanurate foams from a polyisocyanate/polyester polyol system.

The foams were prepared according to the procedure of Example 1 from the quantities of ingredients listed below in Table VII. Characteristics of the foams produced are shown in the table. The data indicate the effectiveness of both perfluorocarbons in improving foam insulation value and friability.

TABLE VI

PREPARATION OF POLYISOCYANURATE FOAMS

| | FOAM | | | | |
|---|---|---|---|---|---|
| | A | B | C | D | E |
| INGREDIENTS (pts by weight) | | | | | |
| Isocyanate[1] | 254.5 | 254.5 | 244.5 | 244.5 | 244.5 |
| R-11B | 55 | 55 | 55 | 55 | 55 |
| Surfactant[2] | 2 | 2 | 2 | 2 | 2 |
| Polyol PS-3152C[3] | 45.5 | 45.5 | 0 | 0 | 0 |
| Polyol PS-2002[4] | 0 | 0 | 55.5 | 55.5 | 55.5 |
| Perfluorocarbon FC-84[5] | 0 | 10.1 | 0 | 2.6 | 10.1 |
| Catalyst[6] | 11.2 | 11.1 | 11.1 | 11.0 | 11.1 |
| FOAM PROPERTIES | | | | | |
| Reactivity (sec) (Cream/Gel/Firm/Tack-free) | 13/36/41/46 | 13/—/45/54 | 11/40/42/57 | 11/—/45/75 | 11/42/45/80 |
| Density (lb/ft³) | 1.78 | 1.81 | 1.83 | 1.82 | 1.86 |
| % Close Cells | 89.8 | 87.2 | 89.2 | 91.8 | 91.5 |
| Compressive Strength (psi at 10% deflection or yield) | 32 | 31 | 29 | 26 | 26 |
| Friability (% wt loss) | 14.2 | 10.6 | 14.4 | 9.9 | 7.7 |
| k-factor Aging, 1" Thick Core (Btu-in/hr-ft²-°F.) | | | | | |
| Initial | .118 | .111 | .114 | .106 | .104 |
| 10 Days | .128 | .124 | .125 | .120 | .118 |

Footnotes:
[1] Polyester polyol derived quasi-prepolymer having a viscosity of 8,050 cps at 25° C. and a free isocyanate content of 25.5% (BASF Corporation).
[2] Of Example 2.
[3] Of Example 1.
[4] Polyol PS-2002 = reaction product of phthalic anhydride and DEG having a hydroxyl number of 200, a viscosity at 25° C. of 9,120 cps and 4% free DEG (Stepan Company).
[5] Of Example 2.
[6] Of Example 1.

TABLE VII

PREPARATION OF POLYISOCYANURATE FOAMS

| | FOAM | | | | |
|---|---|---|---|---|---|
| | A | B | C | D | E |
| INGREDIENTS (pts by weight) | | | | | |
| Isocyanate[1] | 224 | 224 | 224 | 224 | 224 |
| R-11B | 54 | 54 | 54 | 54 | 54 |
| Surfactant[2] | 2 | 2 | 2 | 2 | 2 |
| Polyol PS-2502A[3] | 76 | 76 | 76 | 76 | 76 |
| Perfluorocarbon L-11722[4] | 0 | 0 | 2.7 | 5.3 | 10.3 |
| Perfluorocarbon FC-72[5] | 0 | 10 | 0 | 0 | 0 |
| Catalyst[6] | 11.4 | 11.5 | 11.4 | 11.6 | 11.3 |
| FOAM PROPERTIES | | | | | |
| Reactivity (sec) (Cream/Gel/Firm/Tack-free) | 17/29/33/40 | 16/29/34/39 | 17/27/33/37 | 17/27/32/38 | 17/28/34/38 |
| Density (lb/ft³) | 1.71 | 1.66 | 1.70 | 1.70 | 1.70 |
| % Close Cells | 88.6 | 89.6 | 89.5 | 89.4 | 90.4 |
| Compressive Strength (psi at 10% deflection or yield) | 32 | 31 | 30 | 29 | 35 |
| Friability (% wt loss) | 17.4 | 8.8 | 12.6 | 12.7 | 13.6 |

TABLE VII-continued
PREPARATION OF POLYISOCYANURATE FOAMS

| | FOAM | | | | |
|---|---|---|---|---|---|
| | A | B | C | D | E |
| k-factor Aging, 1" Thick Core (Btu-in/hr-ft²-°F.) | | | | | |
| Initial | .118 | .109 | .112 | .110 | .110 |
| 11 Days | .134 | .127 | .132 | .130 | .125 |
| 32 Days | .144 | .138 | .144 | .137 | .137 |
| 61 Days | .150 | .140 | .146 | .143 | .142 |

Footnotes:
[1] Of Example 1.
[2] Of Example 2.
[3] Of Example 3.
[4] Perfluorocarbon L-11722 = perfluorinated hydrocarbons with a typical boiling point of 50° C. supplied by the 3M Company.
[5] Of Example 2.
[6] Of Example 1.

Footnotes: 1. Of Example 1. 2. Of Example 2. 3. Of Example 3. 4. Perfluorocarbon L-11722=perfluorinatd hydrocarbons with a typical boiling point of 50° C. supplied by the 3M Company. 5. Of Example 2. 6. Of Example 1.

EXAMPLE 8

This example illustrates the use of a perfluorinated hydrocarbon additive in the preparation of a polyisocyanurate foam from another polyisocyanate/polyester polyol system.

The foams were prepared according to the procedure of Example 1 from the ingredients and quantities thereof listed below in Table VIII. The Table VIII results show that an improved insulating foam is provided by use of the perfluorocarbon.

TABLE VIII
PREPARATION OF POLYISOCYANURATE FOAMS

| | FOAM | |
|---|---|---|
| | A | B |
| INGREDIENTS (pts by wt) | | |
| Isocyanate[1] | 224 | 224 |
| R-11B | 55 | 55 |
| Surfactant[2] | 2 | 2 |
| Polyol Chardol 329[3] | 76 | 76 |
| Perfluorocarbon FC-84[4] | 0 | 10.3 |
| Catalyst[5] | 11.0 | 10.8 |
| FOAM PROPERTIES | | |
| Reactivity (sec) (Cream/Gel/Firm/Tack-free) | 10/20/23/30 | 10/—/24/30 |
| Density (lb/ft³) | 1.74 | 1.80 |
| % Closed Cells | 88.4 | 91.6 |
| Initial k-factor of 1" Thick Core (Btu-in/hr-ft²-°F.) | .118 | .112 |

[1] Of Example 1.
[2] Of Example 2.
[3] Polyol Chardol 329 = polyester polyol derived from PET scrap and characterized by a hydroxyl number of 240 and a viscosity at 25° C. of 10,400 cps (Chardonol Division, Freeman Chemical Corp.)
[4] Of Example 2.
[5] Of Example 1.

EXAMPLE 9

This example illustrates a large-scale preparation of a polyisocyanurate foam utilizing a perfluorinated hydrocarbon additive of the present invention.

In each foam preparation, the quantities of ingredients listed below in Table IX were employed. First, the A-component (a mixture of the isocyanate, blowing agent, surfactant and perfluorocarbon) was blended in a tank under mild refrigeration. The B-component (polyester polyol) and C-component (catalyst) were placed in separate tanks, and the contents of all three tanks were metered through respective feed lines to a Martin-Sweets mixing head. All ingredients were thoroughly mixed and deposited from the mixing head into a box. Characteristics of the foams produced are shown in Table IX. Photographs of these foams taken with a scanning photomicrograph reveal that the average diameter of cells produced with the perfluorinated additive are about one half the diameter of the control foam cells as determined by ASTM D 3576-77.

TABLE IX
PREPARATION OF POLYISOCYANURATE FOAMS

| | FOAM | |
|---|---|---|
| | A | B |
| INGREDIENTS (pts by wt) | | |
| A-Component | | |
| Isocyanate[1] | 224 | 224 |
| R-11B | 54 | 54 |
| Surfactant[2] | 2 | 2 |
| Perfluorocarbon L-11722[3] | 0 | 10 |
| B-Component | | |
| Polyol PS-2502A[4] | 76 | 76 |
| C-Component | | |
| Catalyst[5] | 19.8 | 20.7 |
| FOAM PROPERTIES | | |
| Reactivity (sec) (Cream/Gel/Firm/Tack-free) | 16/29/32/37 | 17/30/33/37 |
| Density (lb/ft³) | 1.61 | 1.60 |
| % Close Cells | 90.6 | 92.4 |
| Cell Size (mm) Par. to rise | .41 | .20 |
| Cell Size (mm) Perp. to rise | .31 | .17 |
| Compressive Strength (psi at 10% deflection or yield) | 25 | 21 |
| Friability (% wt loss) | 34.1 | 16.4 |
| k-factor Aging, 1" Thick Core (Btu-in/hr-ft²-°F.) | | |
| Initial | .111 | .102 |
| 9 Days | .122 | .112 |

[1] Isocyanate having an equivalent weight of 140, an acidity of 0.03% HCl, and a viscosity of 2000 cps at 25° C..
[2] Of Example 2.
[3] Of Example 6.
[4] Of Example 3.
[5] Isocyanurate promoting catalyst (Pelron Corporation).

I claim:

1. In a process for producing a rigid polyurethane or polyisocyanurate foam from a foam forming mixture comprising an organic polyisocyanate, a polyol, a blowing agent, and a catalyst, the improvement comprising adding to the foam forming mixture a perfluorinated material selected from the group consisting of a perfluorinated hydrocarbon or a mixture of perfluorinated hydrocarbons, the boiling point of the perfluorinated material being less than about 215° C.

2. The process of claim 1 wherein the polyisocyanate is a member selected from the group consisting of a polymethylene polyphenylisocyanate, an isocyanate group-terminated quasi-prepolymer, and mixtures thereof.

3. The process of claim 1 wherein the polyol is a member selected from the group consisting of a polyester polyol, a polyether polyol, and mixtures of polyester polyols and polyether polyols.

4. The process of claim 1 wherein the polyol comprises an aromatic polyester polyol.

5. The process of claim 1 wherein the perfluorinated material is a liquid whose boiling point is less than about 105° C.

6. The process of claim 1 wherein the perfluorinated material is from about 0.2 to 15% by weight of the reactive components in the foam forming mixture.

7. A rigid polyurethane foam comprising the reaction product of an organic polyisocyanate, a polyol, a blowing agent, a catalyst, and a perfluorinated material selected from the group consisting of a perfluorinated hydrocarbon or a mixture of perfluorinated hydrocarbons, the boiling point of the perfluorinated material being less than about 215° C.

8. The foam of claim 7 wherein the polyisocyanate is a member selected from the group consisting of a polymethylene polyphenylisocyanate, an isocyanate group-terminated quasi-prepolymer, and mixtures thereof.

9. The foam of claim 7 wherein the polyol is a member selected from the group consisting of a polyester polyol, a polyether polyol, and mixtures of polyester polyols and polyether polyols.

10. The foam of claim 9 wherein the perfluorinated material is a liquid whose boiling point is less than about 105° C.

11. A rigid polyisocyanurate foam comprising the reaction product of an organic polyisocyanate, a blowing agent, a catalyst, a minor amount of a polyol, and a perfluorinated material selected from the group consisting of a perfluorinated hydrocarbon or a mixture of perfluorinated hydrocarbons, the boiling point of the perfluorinated material being less than about 215° C.

12. The foam of claim 11 wherein the polyisocyanate is a member selected from the group consisting of a polymethylene polyphenylisocyanate, an isocyanate group-terminated quasi-prepolymer, and mixtures thereof.

13. The foam of claim 12 wherein the polyol is a member selected from the group consisting of a polyester polyol and a mixture of a polyester polyol and a polyether polyol.

14. The foam of claim 13 wherein the perfluorinated material is a liquid whose boiling point is less than about 105° C.

15. A laminate comprising at least one facing sheet adhered to the polymer foam of claim 7.

16. The laminate of claim 15 wherein the polyisocyanate is a member selected from the group consisting of a polymethylene polyphenylisocyanate, an isocyanate group-terminated quasi-prepolymer, and mixtures thereof, and the polyol is a member selected from the group consisting of a polyester polyol and a mixture of a polyester polyol and a polyether polyol.

17. The laminate of claim 16 wherein the perfluorinated material is a liquid whose boiling point is less than about 105° C.

18. A laminate comprising at least one facing sheet adhered to the polymer foam of claim 11.

19. The laminate of claim 18 wherein the polyisocyanate is a member selected from the group consisting of a polymethylene polyphenylisocyanate, an isocyanate group-terminated quasi-prepolymer, and mixtures thereof, and the polyol is a member selected from the group consisting of a polyester polyol and a mixture of a polyester polyol and a polyether polyol.

20. The laminate of claim 19 wherein the perfluorinated material is a liquid whose boiling point is less than about 105° C.

* * * * *